United States Patent
Inoue et al.

(10) Patent No.: US 7,147,693 B2
(45) Date of Patent: Dec. 12, 2006

(54) ENGINE EXHAUST GAS PURIFICATION DEVICE

(75) Inventors: Takao Inoue, Yokohama (JP); Junichi Kawashima, Yokosuka (JP); Naoya Tsutsumoto, Yokohama (JP); Makoto Otake, Yokohama (JP); Terunori Kondou, Yokohama (JP); Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 445 days.

(21) Appl. No.: 10/823,495

(22) Filed: Apr. 6, 2004

(65) Prior Publication Data

US 2004/0200198 A1    Oct. 14, 2004

(30) Foreign Application Priority Data

Apr. 8, 2003    (JP) ............................. 2003-104363

(51) Int. Cl.
*B01D 46/00* (2006.01)

(52) U.S. Cl. ................. 95/273; 95/1; 95/19; 95/278; 55/282.2; 55/282.3; 55/283; 55/385.3; 55/523; 55/DIG. 10; 55/DIG. 30; 96/417; 96/421; 60/311

(58) Field of Classification Search ............... 55/282.2, 55/282.3, 283, 285.3, 523, DIG. 10, DIG. 30; 95/1, 19, 20, 273, 278; 96/417, 421, 422; 60/295, 297, 311
See application file for complete search history.

(56) References Cited

U.S. PATENT DOCUMENTS

| | | | |
|---|---|---|---|
| 6,253,601 B1 | 7/2001 | Wang et al. | |
| 6,622,480 B1 * | 9/2003 | Tashiro et al. | 60/311 |
| 6,928,809 B1 * | 8/2005 | Inoue et al. | 55/DIG. 30 |
| 2001/0010152 A1 * | 8/2001 | Tallec et al. | 60/311 |
| 2002/0112472 A1 | 8/2002 | Tashiro et al. | |
| 2006/0005534 A1 * | 1/2006 | Wirth et al. | 60/311 |

FOREIGN PATENT DOCUMENTS

| | | | |
|---|---|---|---|
| EP | 1 229 223 A1 * | 8/2002 |
| EP | 1 281 843 * | 2/2003 |
| EP | 1 281 843 A2 | 2/2003 |
| JP | 62-35009 * | 8/1985 |
| JP | 62-35009 A | 2/1987 |
| JP | 2000-234509 A | 8/2000 |
| JP | 2002-242660 A | 8/2002 |

* cited by examiner

*Primary Examiner*—Jason M. Greene
(74) *Attorney, Agent, or Firm*—Foley & Lardner LLP

(57) ABSTRACT

An engine exhaust gas purification device is disclosed. The purification device has a filter (13) which traps particulate matter contained in the exhaust gas from an engine; a differential pressure detection sensor (16) which detects a differential pressure of the filter; a sensor (14, 15, 21, 31, 33) which detects an engine running state, and a microcomputer (22). The microcomputer (22) is programmed to compute an estimated ash amount ASH_a of the filter based on the detected differential pressure; compute an oil consumption amount OC_total based on the detected engine running state; compute an ash density DENS_ASH from the oil consumption amount OC_total and estimated ash amount ASH_a, and compute an ash amount ASH of the filter based on the oil consumption amount OC_total and ash density DENS_ASH.

9 Claims, 6 Drawing Sheets

ENGINE EXHAUST GAS PURIFICATION DEVICE

FIELD OF THE INVENTION

This invention relates to an engine exhaust gas purification device, and more particularly to a technique for correctly determining the replacement timing of a filter which traps particulate matter in engine exhaust gas.

BACKGROUND OF THE INVENTION

Tokkai No. 2000-234509 published by the Japanese Patent Office in 2000 discloses an exhaust gas purification device which carries out the purification of particulate matter discharged from a diesel engine or the like. The purification device comprises a filter in the engine exhaust system, the filter being regenerated by oxidizing or incinerating the trapped particulate matter at a predetermined interval.

In addition to combustible particulate matter, non-combustibles (hereafter, referred to as "ash") mainly from engine oil additives also adhere to the filter. As the ash cannot be burnt in the process of regeneration, after a certain time interval has elapsed, it will cause a pressure loss in the filter, and a reduction of active filter surface area. For this reason, the filter needs maintenance such as replacement or washing according to use.

SUMMARY OF THE INVENTION

However, in the prior art, the ash deposit amount was estimated from the engine running time or vehicle running distance, so there is a significant error. In practice, the maintenance period was determined allowing for this error, so maintenance was performed in a shorter time than was necessary. It is known that the ash deposit amount is correlated to some extent with engine oil consumption, but the ash density differs depending on the engine oil type or state. Hence, even if the oil consumption is correctly detected, the correct ash deposit amount cannot necessarily be estimated.

It is therefore an object of this invention to correctly determine an ash amount ASH adhering to a filter in order to perform washing or replacement of the filter at a suitable timing.

In order to achieve the above object, this invention provides an engine exhaust gas purification device, comprising: a filter which traps particulate matter contained in the exhaust gas from an engine; a differential pressure detection sensor which detects a differential pressure of the filter; a sensor which detects an engine running state; and a microcomputer. The microcomputer is programmed to compute an estimated ash amount ASH_a of the filter based on the detected differential pressure; compute an engine oil consumption amount OC_total based on the detected engine running state; compute an ash density DENS_ASH from the oil consumption amount OC_total and estimated ash amount ASH_a; and compute an ash amount ASH of the filter based on the oil consumption amount OC_total and ash density DENS_ASH.

The details as well as other features and advantages of this invention are set forth in the remainder of the specification and are shown in the accompanying drawings.

DESCRIPTION OF THE PREFERRED EMBODIMENTS

Figure 1:
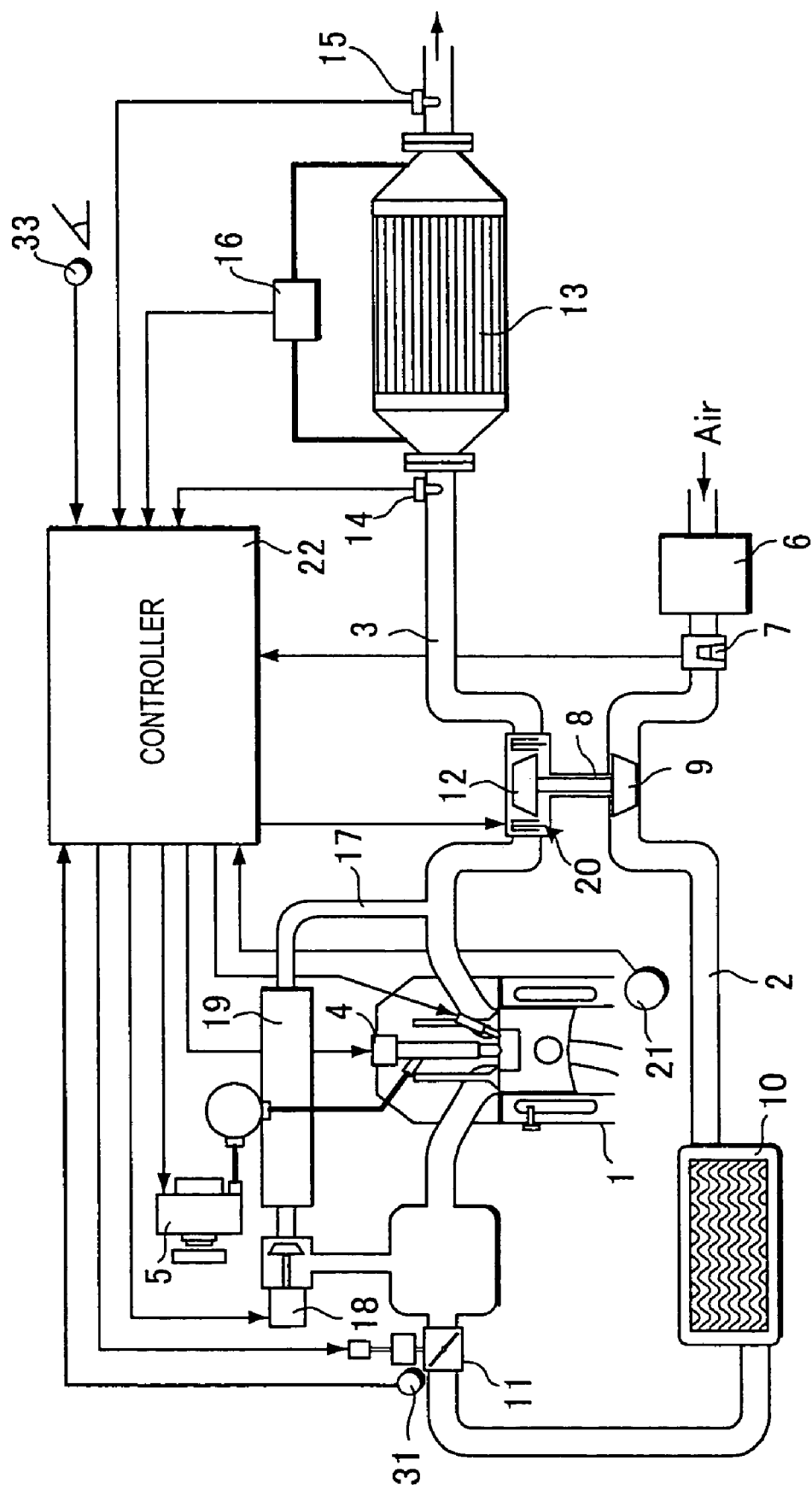
FIG. 1 is a schematic view of an engine system to which this invention can be applied.

Referring to FIG. 1, an engine system to which this invention can be applied is equipped with an engine 1, an air passage 2 for introducing air and an exhaust passage 3 for discharging the exhaust gas produced from the engine 1. The engine system is preferably used for a vehicle. The engine 1 may be a diesel engine, although not limited to a diesel engine. A fuel injector 4 connected to a fuel injection pump 5 is mounted in the engine 1. The air passage 2 is provided with an air cleaner 6, air flow meter 7, compressor 9 of an exhaust gas turbocharger 8, intercooler 10 and throttle valve 11 in sequence from the upstream side. The exhaust passage 3 is provided with a turbine 12 of the exhaust gas turbocharger 8 and a filter 13 which traps particulate matter in the exhaust gas produced from the engine 1 in sequence from the upstream side. If the engine 1 is a diesel engine, the filter 13 may be the so-called diesel particulate filter (DPF).

The exhaust gas purification device comprises a temperature sensor 14 which detects the inlet temperature of the filter 13, a temperature sensor 15 which detects the outlet temperature of the filter 13, and a differential pressure sensor 16 which detects a differential pressure ΔP between the inlet and outlet of the filter 13. The engine system is equipped with an EGR (exhaust gas recirculation) apparatus. The EGR apparatus is equipped with an EGR passage 17 which connects the air passage 2 and the exhaust passage 3, and an EGR valve 18 and EGR cooler 19 disposed in the EGR passage 17. The exhaust gas turbocharger 8 has a variable nozzle 20 which can adjust the flow rate of the exhaust gas flowing into the turbine 12. The engine system is equipped with a crank angle sensor 21 which detects engine rotation speed and crank position.

The controller 22 comprises a microcomputer which has a Central Processing Unit (CPU) which executes programs, a read-only memory (ROM) which stores programs and data, a random-access memory (RAM) which temporarily stores the computation result of the CPU and acquired data, a timer which measures time, and an input/output interface (I/O interface). Based on the signals from the sensors described above, the controller 22 controls a fuel injection timing, fuel injection amount, throttle valve opening, EGR amount, valve opening of the variable nozzle, etc., and further functions as a means for computing the particulate matter deposit amount and the ash amount of the filter 13.

Figure 2:
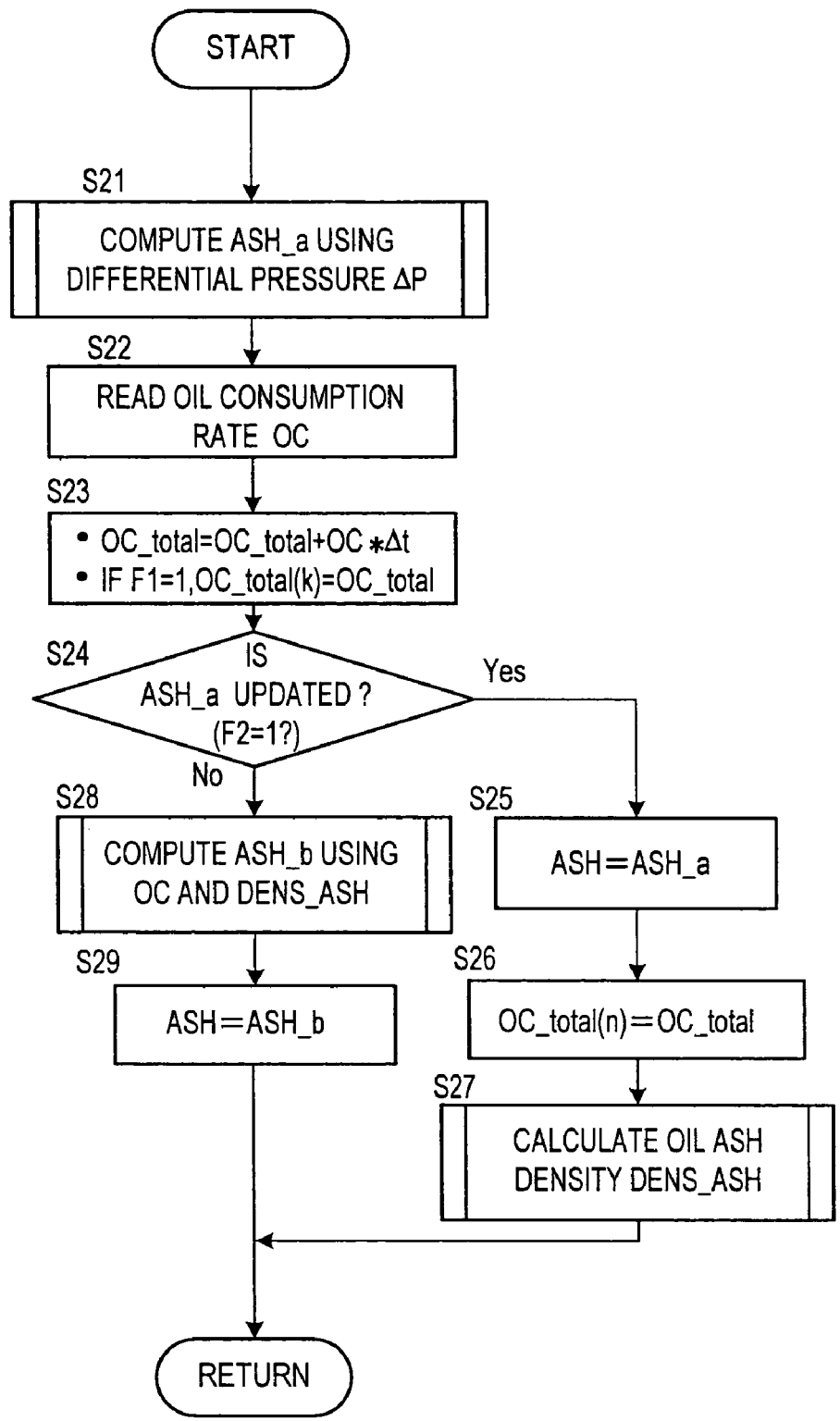
FIG. 2 is a flow chart showing a main routine for computing an ash amount relating to one embodiment of this invention.

FIG. 2 shows a main computing routine for computing the ASH amount executed by the controller 22. This routine is periodically executed at every control period $\Delta t$. For example, the control period $\Delta t$ may be 10 milliseconds. The computed ASH amount is used for determining when the filter should be washed or replaced.

In a Step S21, an estimated ash amount ASH_a is computed using the differential pressure $\Delta P$ of the filter 13 detected by the differential pressure sensor 16.

Figure 2A:
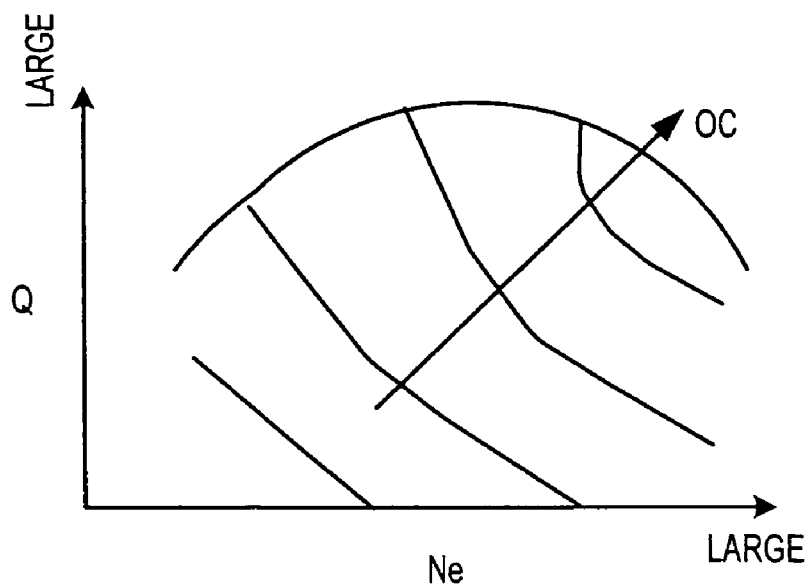
FIG. 2A is a map which gives an engine oil consumption rate according to engine load Q and engine rotation speed Ne.

Next, in a Step S22, an engine oil consumption rate OC is read from a map (shown in FIG. 2A) which is preset to give the oil consumption rate OC from an engine load (torque) Q and engine rotation speed Ne. The engine load Q can be expressed by an intake air amount or fuel injection amount. Also, an engine running state, such as engine rotation speed and intake air amount, is continually detected and stored by another control routine which the controller 22 executes in parallel in the background. The intake air amount may be expressed by a throttle valve opening detected by the throttle valve opening sensor 31. The fuel injection amount may be expressed by the stroke of an accelerator pedal detected by a stroke sensor 33. Otherwise, a fuel injection amount command value of the controller 22 may be used as the fuel injection amount without modification.

Next, in a Step S23, an oil consumption amount OC_total is calculated from the engine running state. The oil consumption amount OC_total is updated by cumulative integration of the product obtained by multiplying the oil consumption rate OC by the control period $\Delta t$ as shown by the following formula:

$$OC\_total = OC\_total + OC \cdot \Delta t \qquad (1)$$

Also, in the Step S23, when a flag F1 described later is set as 1 (F1=1), OC_total is assigned to a variable OC_total(k) described later (OC_total(k)=OC_total).

Next, in a Step S24, it is determined whether or not the estimated ash amount ASH_a has been updated. Specifically, it is determined whether or not an updating flag F2 showing that the estimated ash amount ASH_a has been updated, is set to 1. When the estimated ash amount ASH_a has been updated (F2=1), the routine proceeds to a Step S25.

The estimated ash amount ASH_a is updated when it is read n times in the Step S21. The updating of the estimated ash amount ASH_a means a state wherein the estimated ash amount ASH_a can be set as a computed ash amount ASH. The number n is preferably 2 or more.

In Steps S25–S27, the estimated ash amount ASH_a at this time is set as a computed ash amount ASH in synchronism with the updating of the estimated ash amount ASH_a (Step S25). Also, the oil consumption amount OC_total at this time is assigned to the oil consumption amount OC_total(n) integrated n times (Step S26), and an oil ash density DENS_ASH is then calculated (Step S27).

The processing of Steps S28–S29 is performed during the updating and next updating of the estimated ash amount ASH_a. In the Step S28, an increasing ash amount ASH_b is computed using the ash density DENS_ASH and oil consumption rate OC. In the Step S29, this increasing ash amount ASH_b is set as the computed ash amount ASH.

Next, the calculation for the estimated ash amount ASH_a, ash density DENS_ASH and increasing ash amount ASH_b will be described in detail.

Figure 3:
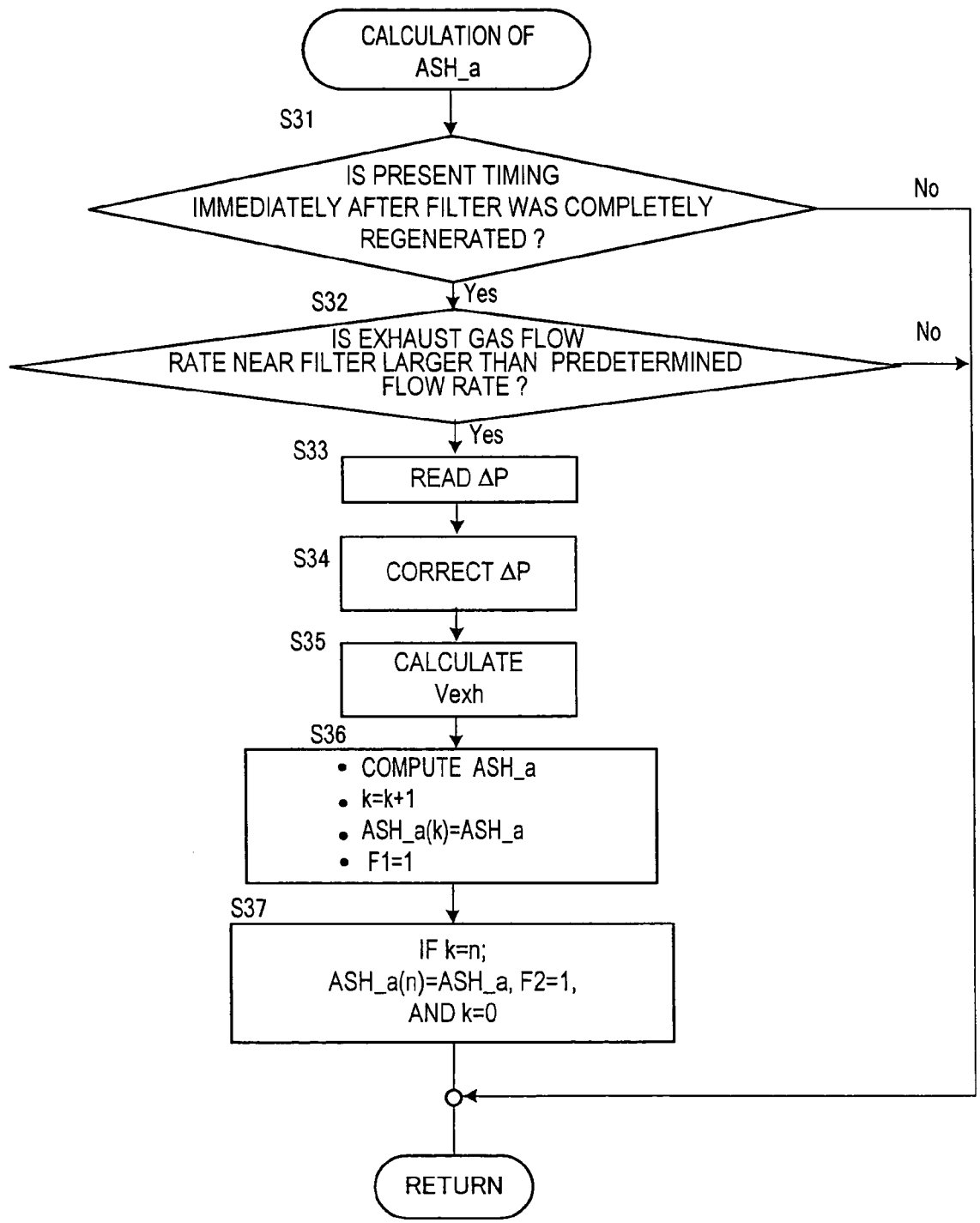
FIG. 3 is a flow chart shows a first subroutine for calculating the ash amount. The first subroutine estimates the ash amount based on a filter differential pressure.

FIG. 3 is a computation subroutine to compute the estimated ash amount ASH_a corresponding to the Step S21 of FIG. 2.

In a Step S31, it is determined whether or not the present timing is immediately after the filter 13 was completely regenerated. Immediately after the filter 13 was completely regenerated, inflammable particulate matter is completely eliminated from the filter 13, so the differential pressure $\Delta P$ in the state where only ash adhered to the filter 13 can be correctly computed. For example, if the elapsed time after complete regeneration is within 1 second, or the vehicle running distance after complete regeneration is within 1 km, it is determined that the timing is immediately after complete regeneration. The vehicle may have a vehicle speed sensor which detects vehicle speed, and the controller 22 may compute the running distance from the vehicle speed and elapsed time.

In one example of filter regeneration, when the accumulation amount of the particulate matter exceeds a predetermined reference value, the particulate matter is oxidized by a catalytic reaction of the filter by raising exhaust gas temperature. In the engine system shown in FIG. 1, the controller 22 performs exhaust gas temperature rise control by any of intake air throttling by a throttle valve 11, retardation of fuel injection timing, secondary injection (post injection), EGR amount reduction and opening control of a variable nozzle 20. The controller 22 can store the fact that the filter 13 has been completely regenerated for example by setting a flag. Exhaust gas temperature rise control maintains an exhaust gas temperature of 300 degrees C or more required for regeneration. The filter regeneration device comprises the controller 22, engine 1, exhaust passage 3, and at least one of the throttle valve 11, fuel injector 4, EGR apparatus and the exhaust turbocharger 8.

Next, in a Step S32, it is determined whether or not the exhaust gas flow rate in the vicinity of the filter 13 (e.g. at the inlet of filter 13 or immediately upstream/downstream of the filter 13) is larger than a predetermined flow rate. The exhaust gas flow rate in the vicinity of the filter 13 is calculated based on the engine running state (Q, Ne) (engine running point). The effect of the ash amount deposited on the filter 13 is more noticeable in the differential pressure $\Delta P$, as the exhaust gas flow rate in the vicinity of the filter 13 increases. When the exhaust gas flow rate is larger than the predetermined flow rate, the ash amount deposited on the filter 13 can be correctly estimated as the differential pressure $\Delta P$ is sufficiently large. The controller memory may store a map (not shown) for obtaining the exhaust gas flow rate in the vicinity of the filter 13 relative to the engine running state (Q, Ne).

When the timing is not immediately after complete filter regeneration in the determination of Step S31, or when the exhaust gas flow rate is smaller than the predetermined flow rate in the determination of the Step S32, the sequence returns to the routine of FIG. 2 without performing any processing. Immediately after complete filter regeneration when the exhaust gas flow rate is larger than the predetermined flow rate, the estimated ash amount is computed in the Step S33 and thereafter.

In the Step S33, the differential pressure $\Delta P$ of the filter is read from the differential pressure sensor 16. Next, in a Step S34, the read differential pressure $\Delta P$ of the filter is corrected. The differential pressure $\Delta P$ is corrected taking account of the exhaust gas temperature and exhaust gas pressure, and the corrected differential pressure is set as a new differential pressure ΔP. The exhaust gas temperature is detected by the temperature sensor 14 or 15. The exhaust gas pressure is obtained by reading a map which determines exhaust gas pressure based on a running state of the engine. Next, in a Step S35, a flow rate Vexh of the exhaust gas newly and directly produced from the engine 1 is computed, eliminating the influence of the recirculating exhaust gas flow rate in EGR passage 17. The exhaust gas flow rate Vexh is computed from the air flow amount detected by the air flow meter 7, and the fuel injection amount, exhaust gas temperature and exhaust gas pressure.

Figure 3A:
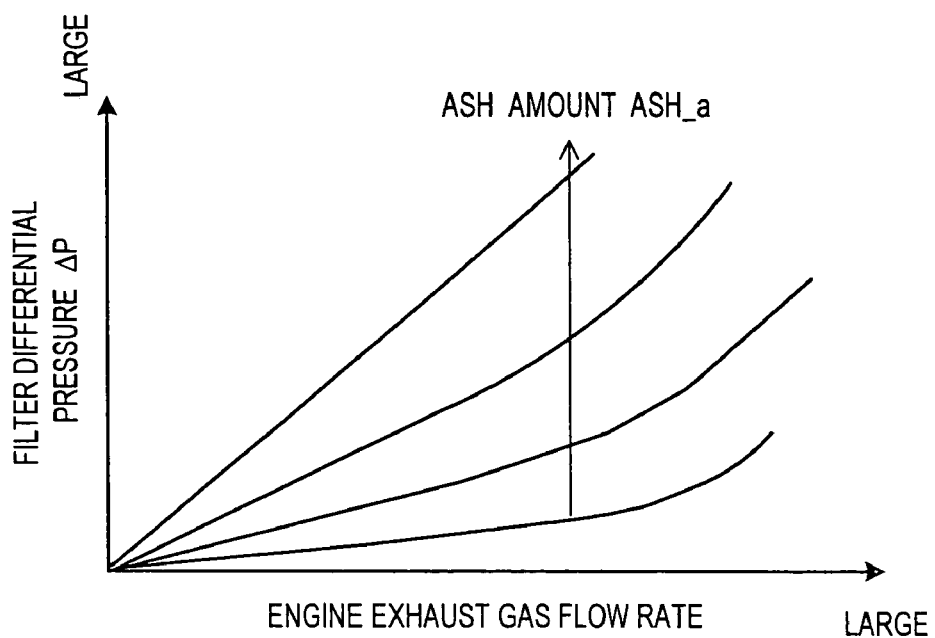
FIG. 3A is a map which gives the estimated ash amount according to the differential pressure and engine exhaust gas flow rate.

Next, in a Step S36, the estimated ash amount ASH_a is calculated from the differential pressure ΔP and the exhaust gas flow rate Vext computed as described above. This computation is performed by processing which reads ASH_a from a predetermined map shown in FIG. 3A. The predetermined map gives the estimated ash amount ASH_a according to the differential pressure ΔP and the exhaust gas flow rate Vext. Subsequently, a counter k showing the number of times of reading ASH_a is increased by unity, and ASH_a is assigned to ASH_a(k). Then, a flag F1 which indicates that the estimated ash amount ASH_a is computed is set (F1=1). The value of ASH_a(k) and the value of the counter k are stored by the RAM. Subsequently, in a Step S37, only when the Counter k reaches n (i.e., only when the computation of the estimated ash amount ASH_a is repeated n times) (k=n), the estimated ash amount ASH_a is assigned to ASH_a(n), the updating flag F2 of ASH_a is set (F2=1), and the Counter k is reset (k=0). When the Counter k has not reached n (k<n), in the Step S37, no processing is performed. Subsequently, the subroutine returns to the main routine of FIG. 2.

Figure 2B:
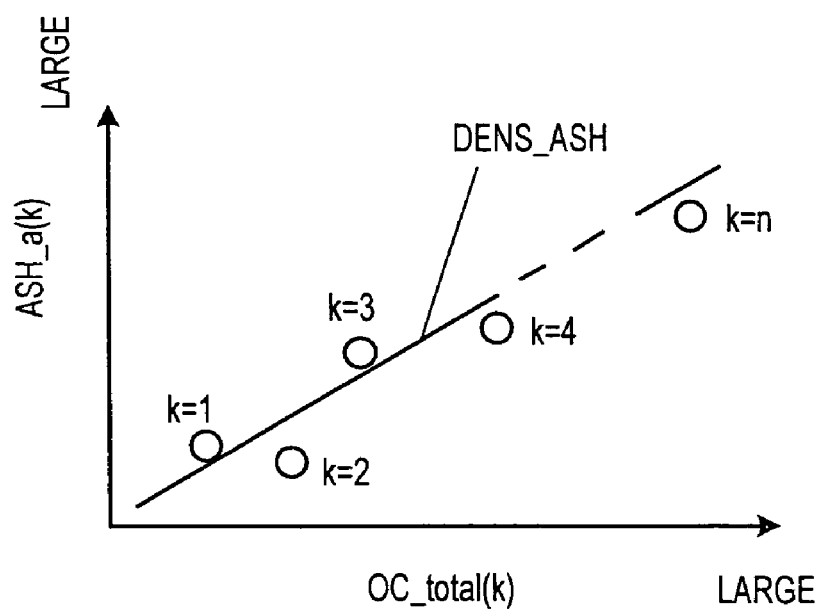
FIG. 2B shows a typical plot of an estimated ash amount relative to oil consumption, and an approximate straight line.

In the Step S27, the ash density DENS_ASH is computed as the slope of an approximate straight line obtained by linear fitting using the method of least squares for a plot of the estimated ash amount ASH_a computed as described above and the corresponding oil consumption amount OC_total (FIG. 2B). The slope of the approximate straight line expresses the average increase rate of the estimated ash amount ASH_a relative to the oil consumption amount OC_total, and gives the approximate value of the ash density DENS_ASH. FIG. 2B shows a plot of ASH_a(k) relative to OC_total (k) (k=1,2, . . . ,n) and approximate straight line.

Figure 4:
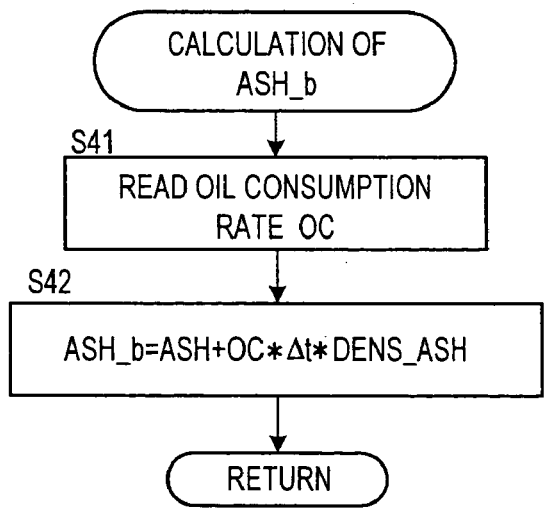
FIG. 4 is a flow chart showing a second subroutine for calculating the ash amount. The second subroutine computes the ash amount which increases with time.

The computation of the increasing ash amount ASH_b is performed by the subroutine of FIG. 4. In a Step S41, the oil consumption rate OC is obtained from the engine running state (Q, Ne) by map search as the Step S22 of FIG. 2. Next, in a Step S42, as shown by the following formula, the product of multiplying the oil consumption rate OC by the control period Δt and the aforesaid ash density DENS_ASH is added to the computed ash amount ASH.

$$ASH\_b = ASH + OC\cdot\Delta t\cdot DENS\_ASH \quad (2)$$

Herein, as the ash density DENS_ASH is not computed until the first updating of the estimated ash amount ASH_a, until then, the increasing ash amount ASH_b is computed by setting the ash density DENS_ASH to a predetermined initial value.

Figure 5:
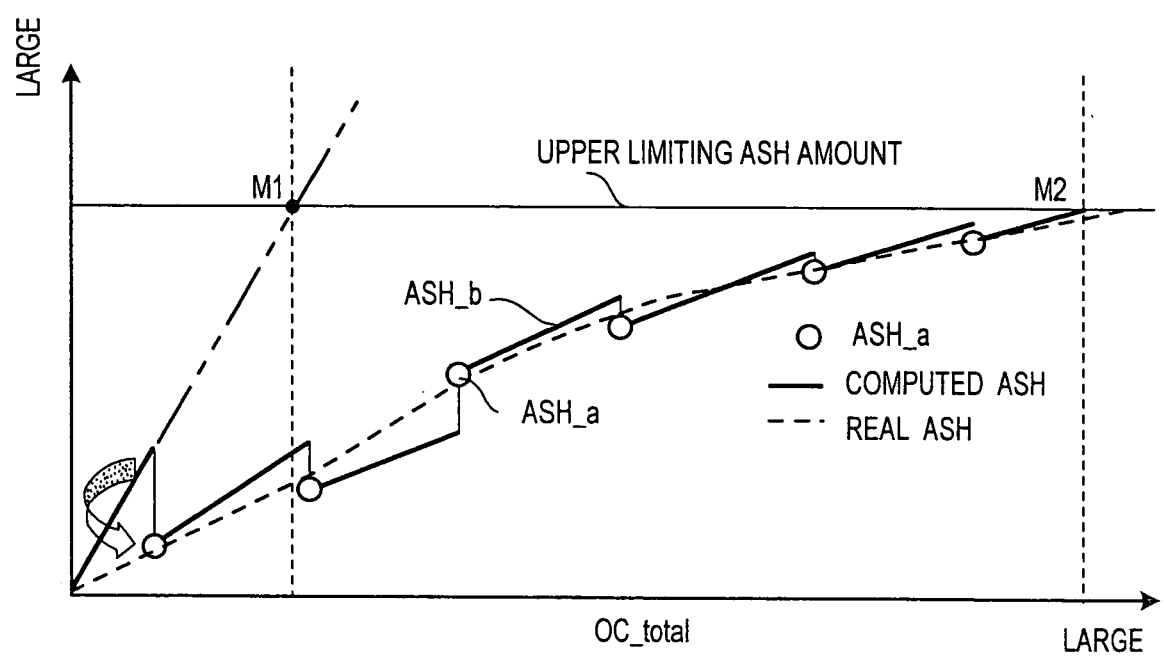
FIG. 5 is a graph showing an actual variation of the ash amount, and the ash amount computed according to the embodiment.

The result of computing the ash amount ASH by the aforesaid method is shown in FIG. 5. The solid line in the figure represents the computed ash amount ASH, the dotted line represents the actual ash amount variation, and the open circle of FIG. 5 represents an updating of the ash amount using the estimated ash amount ASH_a. The computation of the ash amount ASH using the predetermined initial value of ash density DENS_ASH is performed until the estimated ash amount ASH_a receives the first updating. The predetermined initial value of the ash density DENS_ASH is determined on the large side for safety. In this case, since the computation of the ash amount ASH is effectively dependent on the running history related only to the oil consumption amount OC_total, the computed ash amount ASH increases relatively rapidly. The point M1 of FIG. 5 shows the time (or the oil consumption amount) to reach the limiting ash amount assuming the ash density DENS_ASH is maintained at its initial value, and that computation of the ash amount is continued. The upper limiting ash amount represents the ash amount when the filter should be replaced. On the other hand, according to this invention, the ash density DENS_ASH is corrected while periodically updating the estimated ash density ASH_a based on the filter differential pressure. For this reason, as shown by the continuous line, the computated ash amount ASH approximates the actual variation (dotted line) of the ash amount. Due to this, the time (shown by the point M2 in the figure) to reach the limiting ash amount can be correctly determined. The controller 22 may be electrically coupled to an indicator which informs a driver or operator of the engine system that the computed ash amount ASH has reached the upper limiting ash amount.

In the aforesaid embodiment, the oil consumption amount is used for computing the increasing ash amount ASH_b and ash density DENS_ASH, but the increasing ash amount ASH_b and ash density DENS_ASH may be computed based on the vehicle running distance or engine running time, instead of on the oil consumption amount. That is, the oil consumption amount may be represented by a vehicle running distance or engine running time.

The entire contents of Japanese Patent Application P2003-104363 (filed Apr. 8, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An engine exhaust gas purification device, comprising:
   a filter which traps particulate matter contained in the exhaust gas from an engine;
   a differential pressure detection sensor which detects a differential pressure of the filter;
   a sensor which detects an engine running state; and
   a microcomputer programmed to:
   compute an estimated ash amount ASH_a of the filter based on the detected differential pressure;
   compute an engine oil consumption amount OC_total based on the detected engine running state;
   compute an ash density DENS_ASH from the oil consumption amount OC_total and estimated ash amount ASH_a; and
   compute an ash amount ASH of the filter based on the oil consumption amount OC_total and ash density DENS_ASH.

2. The engine exhaust gas purification device as defined in claim 1, further comprising a regeneration device which burns particulate matter trapped by the filter.

3. The engine exhaust gas purification device as defined in claim 1, wherein the microcomputer is provided with a map which gives an ash amount relative to an engine exhaust gas flow rate and the filter differential pressure, and is programmed to:
   compute the engine exhaust gas flow rate based on the detected engine running state; and compute the estimated ash amount ASH_a by looking up the map from the computed exhaust gas flow rate and detected filter differential pressure.

4. The engine exhaust gas purification device as defined in claim 2, wherein the microcomputer performs regeneration control of the filter, and the microcomputer is programmed to:
compute an exhaust gas flow rate in a vicinity of the filter based on the engine running state;
determine whether or not the filter has completely regenerated;
determine whether or not the computed exhaust gas flow rate is larger than a predetermined flow rate; and
compute the estimated ash amount ASH_a if the filter has completely regenerated and the exhaust gas flow rate in the vicinity of the filter is larger than the predetermined value.

5. The exhaust gas purification device as defined in claim 1, wherein the sensor which detects an engine running state comprises a sensor which detects engine load and a sensor which detects engine rotation speed,
and wherein the microcomputer is provided with a map which gives an oil consumption amount relative to engine load and engine rotation speed, and is programmed to:
compute the oil consumption amount OC_total by looking up the map from the detected engine load and the detected engine rotation speed; and
compute the ash amount from the oil consumption amount OC_total and ash density DENS_ASH in the engine oil.

6. The exhaust gas purification device as defined in claim 1, wherein the microcomputer is programmed to:
compute an average increase rate of the estimated ash amount relative to the oil consumption amount, and set the ash density DENS_ASH to the average increase rate.

7. The exhaust gas purification device as defined in claim 1, wherein the oil consumption amount is represented by a vehicle running distance or engine running time.

8. An engine exhaust gas purification device, comprising:
means for trapping particulate matter contained in the exhaust gas from an engine;
means for detecting a differential pressure of the filter;
means for detecting an engine running state;
means for computing an estimated ash amount ASH_a of the filter based on the detected differential pressure;
means for computing an engine oil consumption amount OC_total based on the detected engine running state;
means for computing an ash density DENS_ASH from the oil consumption amount OC_total and estimated ash amount ASH_a; and
means for computing an ash amount ASH of the filter based on the oil consumption amount OC_total and ash density DENS_ASH.

9. A computing method for computing an ash amount in the filter, comprising the steps of:
detecting a differential pressure of a filter;
detecting an engine running state;
computing an estimated ash amount ASH_a of the filter based on the detected differential pressure;
computing an engine oil consumption amount OC_total based on the detected engine running state;
computing an ash density DENS_ASH from the oil consumption amount OC_total and estimated ash amount ASH_a; and computing an ash amount ASH of the filter based on the oil consumption amount OC_total and ash density DENS_ASH.

* * * * *